United States Patent
Ho (10) Patent No.: US 7,543,079 B1
(45) Date of Patent: Jun. 2, 2009

(54) SYNCHRONIZATION METHOD AND SYSTEM FOR KEEPING TRACK OF ENCODING HISTORY TO MAINTAIN DIGITAL SYSTEM SYNCHRONIZATION DURING COMMUNICATION OVER LOSSY TRANSMISSION MEDIA

(75) Inventor: Winga Ho, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 2095 days.

(21) Appl. No.: 09/587,721

(22) Filed: Jun. 5, 2000

(30) Foreign Application Priority Data

Jun. 11, 1999 (GB) ................... 9913656.6

(51) Int. Cl.
*G06F 15/16* (2006.01)
(52) U.S. Cl. .............. 709/247; 709/203; 709/230; 709/231; 714/775; 341/50
(58) Field of Classification Search ........... 709/247, 709/246, 231, 230, 203; 714/775; 341/50
See application file for complete search history.

(56) References Cited

U.S. PATENT DOCUMENTS

| 5,612,683 | A | * | 3/1997 | Trempala et al. | ........... 340/5.23 |
| 5,907,637 | A | * | 5/1999 | Murashita et al. | ........... 382/239 |
| 6,121,903 | A | * | 9/2000 | Kalkstein | ..................... 341/63 |
| 6,338,120 | B1 | * | 1/2002 | Hanley | ........................ 711/136 |
| 6,560,282 | B2 | * | 5/2003 | Tahara et al. | ................. 375/240 |
| 6,664,913 | B1 | * | 12/2003 | Craven et al. | ................ 341/200 |

FOREIGN PATENT DOCUMENTS

| EP | 0851624 A2 | * | 7/1998 |
| WO | WO 91/10289 | * | 7/1991 |
| WO | WO 91/10289 A1 | | 7/1991 |
| WO | WO 92/10893 | * | 6/1992 |
| WO | WO 92/10893 A1 | | 6/1992 |
| WO | WO 95/14971 | * | 6/1995 |
| WO | WO 95/14971 A1 | | 6/1995 |

OTHER PUBLICATIONS

Lara-Barron, M., and Lockhart, G. "Packet-based Embedded Encoding for Transmission of low-bit-rate-encoded Speech in Packet Networks." IEEE, 1992, pp. 482-487.*
The Authoritative Dictionary of IEEE Standards Terms, 7th Edition, Published by Standards Information Network IEEE Press, p. 379.*

* cited by examiner

*Primary Examiner*—Alina N. Boutah (57) ABSTRACT

Encoded data is transmitted between synchronized sending and receiving digital systems across a lossy transmission media. The systems include respective encoder and decoder information records. If data packets are lost, the encoder rebuilds the encoder record without the missing packet data. Encoding continues using previous encoder records. In a method, packet data is encoded using encoding information in an encoder information record. A new encoder information record is built. The encoded packet data is transmitted to the receiving system with a header. The receiving system examines the header. The packet is decoded using a decoder information record and the decoder information record is updated. The packet is acknowledged to the sending system to enable the sending system to update encoder information. If the packet is lost, the encoder information is conditioned to rebuild new encoder information without the lost packet data. Thus, encoding history is used even when packets are lost.

20 Claims, 5 Drawing Sheets

SYNCHRONIZATION METHOD AND SYSTEM FOR KEEPING TRACK OF ENCODING HISTORY TO MAINTAIN DIGITAL SYSTEM SYNCHRONIZATION DURING COMMUNICATION OVER LOSSY TRANSMISSION MEDIA

FIELD OF THE INVENTION

The present invention relates to communication systems and in particular to a synchronization method and mechanism to maintain synchronization between sending and receiving digital systems communicating over a lossy transmission media.

BACKGROUND OF THE INVENTION

Packet-switched digital communication networks allow digital systems to communicate with each other. In these communication networks, data to be transmitted from one digital system to another is loaded into frames. The frames are then transmitted over the communication network to the destination digital system as packets. Often it is advantageous to compress the data before the data is transmitted as this reduces the amount of data to be transmitted over the communication network. It is also often desired to scramble or encrypt the data prior to transmission. When compressing, scrambling or encrypting data, it is necessary to ensure the transmitting digital system and receiving digital system remain in synchronization. Otherwise, the data encoding and decoding method will operate erroneously.

U.S. Pat. No. 5,130,993 to Gutman et al discloses a method for transmitting encoded data over unreliable networks wherein synchronization between the encoder and decoder is maintained. When encoded data is received by one system, the data is checked for transmission errors after the data has been decoded. If an error is detected, a reset signal is sent by the receiving system to the sending system to reset its encoder to a predetermined state known to the receiving system. The corrupted data can then be resent and decoded by the receiving system. In this manner, the synchronization of encoder and decoder can be maintained.

When the encoder is reset to a predetermined state, there is a reduction in encoding efficiency since the encoding algorithm must relearn its vocabulary. In prior art systems, such as that disclosed by Gutman, the predetermined state does not take advantage of encoding history between the encoder and decoder resulting in reduced system performance.

It is therefore an object of the present invention to provide a novel synchronization method and mechanism for maintaining synchronism between digital systems communicating over a lossy transmission media.

SUMMARY OF THE INVENTION

According to one aspect of the present invention there is provided a method for transmitting encoded data between synchronized sending and receiving digital systems across a lossy transmission media, said sending and receiving digital systems maintaining encoder and decoder information records, said method comprising the steps of:

encoding packet data to be transmitted by said sending digital system using encoding information in an encoder information record that has been previously acknowledged by said receiving digital system;

building a new encoder information record including the encoding information used to encode said packet data as well as the packet data;

transmitting the encoded packet data to said receiving digital system as a packet including a header having a packet number and a tag identifying the encoding information used to encode the packet data;

when the packet is received by said receiving digital system, examining the header to determine the encoding information used to encode said packet data;

decoding the packet using corresponding decoder information in said decoder information record and updating the decoder information in said decoder information record with said packet data;

acknowledging processing of the packet to said sending digital system to enable said sending digital system to update said encoder information so that said new encoder information record is used to encode packet data; and when the packet is lost, conditioning said encoder information to rebuild the new encoder information without the lost packet data.

The present invention provides advantages in that if data packets are lost, the encoder of the sending digital system is conditioned to rebuild the unacknowledged encoder history/state information record without the missing packet data. Encoding can continue using the current or previously acknowledged encoder history/state information records. Thus, encoding history is used to the extent possibly even when packets are lost reducing the amount of vocabulary the encoding algorithm must relearn.

BRIEF DESCRIPTION OF THE DRAWINGS

An embodiment of the present invention will now be described more fully with reference to the accompanying drawings in which:

FIGS. 3a and 3b are illustrations of encoder history/state information records stored by the synchronization mechanism of FIG. 2a;

DETAILED DESCRIPTION OF THE PREFERRED EMBODIMENT

Figure 1:
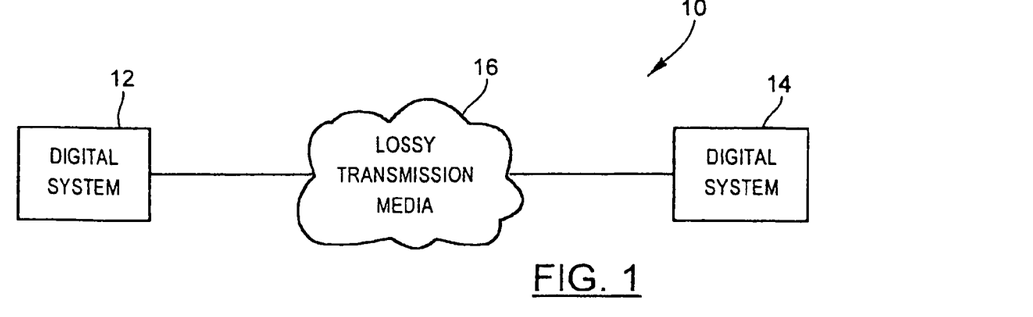
FIG. 1 is a schematic block diagram of a packet-switched digital communication system.

Turning now to FIG. 1, a communication system is shown and is generally indicated to by reference numeral 10. As can be seen, communication system 10 includes a pair of digital systems 12 and 14 which communicate over a lossy transmission media 16 in the form of an unreliable packet-switched digital communication network. During transmission of data from one digital system to the other, the sending digital system 12 loads the data into frames. The sending digital system 12 also compresses and/or encrypts (scrambles), hereinafter referred to as "encodes", the data using encoder information known to the receiving digital system. Once encoded, the data frames are encapsulated with headers as will be described and are transmitted as packets over the lossy transmission media 16.

As each data packet is received, the receiving digital system 14 compares the packet number assigned to the received packet with the packet number of the expected packet to ensure each packet is received. If the packet is expected, the receiving digital system processes the packet using decoder information. During processing, packet information is used to update the decoder information corresponding to the encoder information. Once processed, the receiving digital system 14 sends an acknowledgment (Ack) packet to the sending digital system 12 acknowledging processing of the packet thereby allowing the sending digital system to update its encoder information. If the digital systems are involved in bi-directional data exchange, acknowledgment headers are used to encapsulate data frames in order to acknowledge receipt of packets.

Since the data frames are encoded, it is necessary to ensure that the digital systems 12 and 14 remain in synchronization. Otherwise, data will be decoded erroneously. To maintain the digital systems in synchronization, each of the digital systems includes a synchronization mechanism 18 in accordance with the present invention (see FIGS. 2*a* and 2*b*). The synchronization mechanisms 18 establish a protocol that allows the digital systems 12 and 14 to keep track of each others encoding history and state information. Further specifics of the synchronization mechanisms 18 will now be described.

Figure 2A:
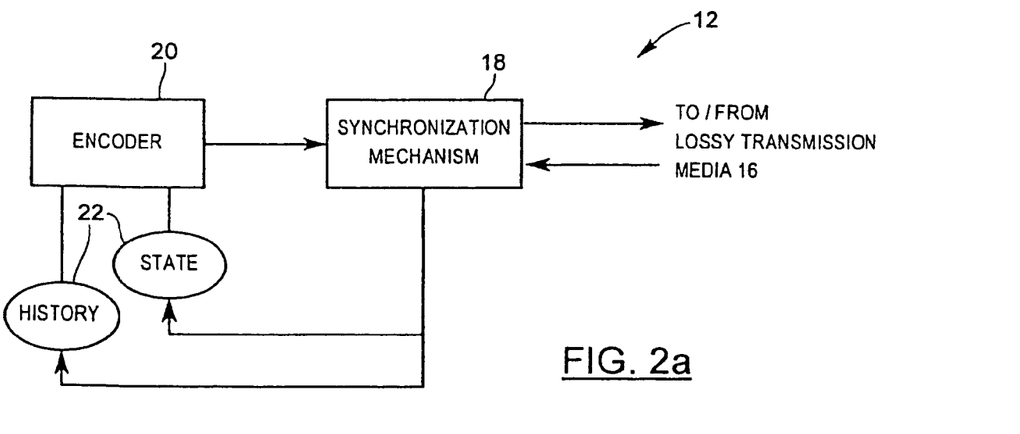
FIGS. 2a and 2b are schematic block diagrams of sending and receiving digital systems forming part of the communication system of FIG. 1 including synchronization mechanisms in accordance with the present invention.

FIG. 2*a* better illustrates the sending digital system 12. As can be seen, the digital system 12 includes an encoder 20 to encode data to be transmitted and to load the data into frames. History and state information concerning the state of the encoder 20 is recorded in memory 22. The synchronization mechanism 18 communicates with the encoder 20 and the memory 22 as well as with the lossy transmission media 16.

Figure 2B:
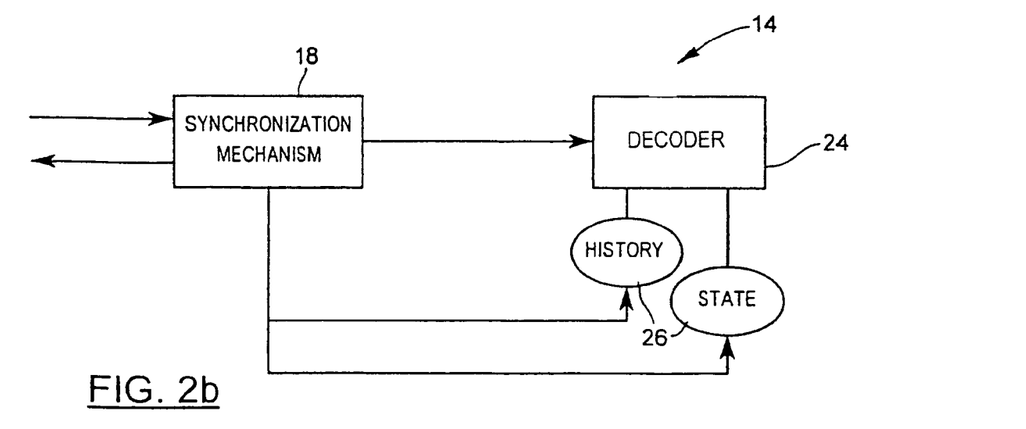

FIG. 2*b* better illustrates the receiving digital system 14. As can be seen, the digital system 14 also includes a synchronization mechanism 18 and a decoder 24 to decode data received from the sending digital system 12. History and state information concerning the state of the decoder 24 is recorded in memory 26.

Figure 3A:
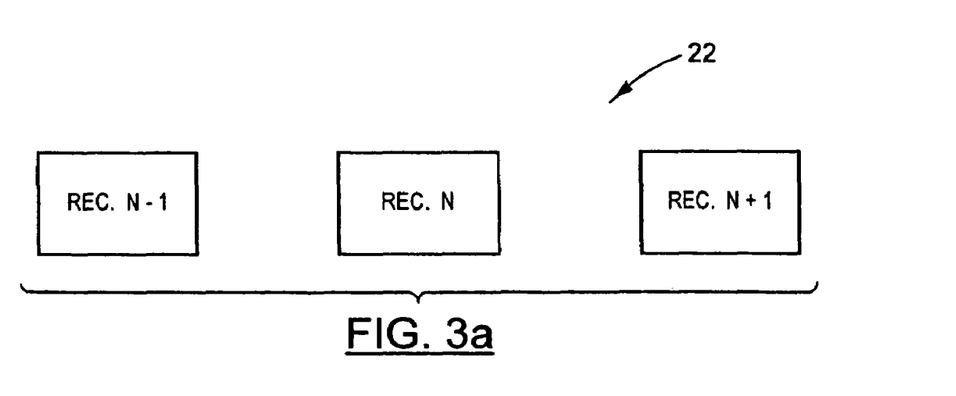
Figure 3B:
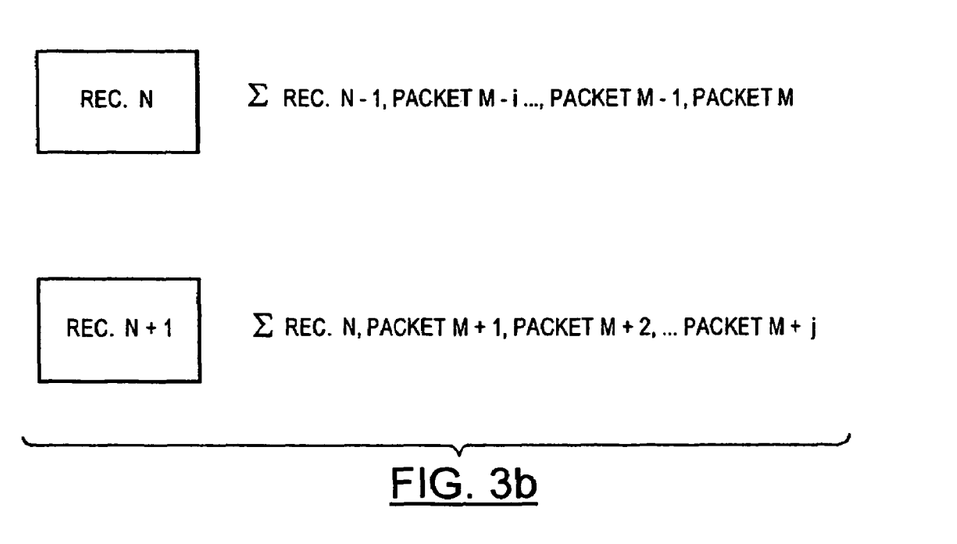

FIGS. 3*a* and 3*b* show an example of the encoder history/state information recorded in memory 22. In this case, the encoder history/state information includes three records, namely record Rec. N−1, record Rec. N and record Rec. N+1. Each record includes a sum of processed information of the previous record and the packets acknowledged by the receiving digital system 14 after acknowledgment of the packets for the previous record. Typically each record will include the sum of processed information of the previous record plus the next packet acknowledged by the receiving digital system. However, if desired, the receiving digital system 14 can be conditioned to send acknowledgments after multiple packets have been processed. Record Rec. N−1 is encoder history/state information that has been previously acknowledged by the decoder 24. Record Rec. N is the current or most recent encoder history/state information that has been acknowledged by the decoder 24. Record Rec. N+1 is encoder history/state information that has not yet been acknowledged by the decoder 24.

When data is to be transmitted by digital system 12, the synchronization mechanism 18 encapsulates each encoded packet with a header including a number of tags. Specifically, each header includes an Encode_Hist_Tag_Used tag identifying the history/state information used by the encoder 20 to encode the packet, that has been acknowledged by the receiving digital system 14, a Pkt_Tag tag identifying the packet number assigned to the packet and an Acking_Peer_Encoder_Hist_Tag tag acknowledging the most recent decoder history/state information processed by decoder 24 that is known by the sending digital system 12.

The synchronization mechanism 18 also generates synch control (Ctl) and synch response packets. These packets are generated when the sending and receiving digital systems 12 and 14 have become unsynchronized and are used to re-synchronize them. The synch control packet includes a Ctl_Pkt_Tag tag assigning a number to the synch control packet so that it may be matched up with its corresponding synch response packet and a Last_Acked_Peer_Xmit_Hist_Tag tag identifying the last known acknowledged state at which the sending and receiving digital systems 12 and 14 were synchronized. The synch response packet also includes a Ctl_Pkt_Tag tag assigning a number to the synch response packet so that it may be matched up with its corresponding synch control packet.

Figure 4:
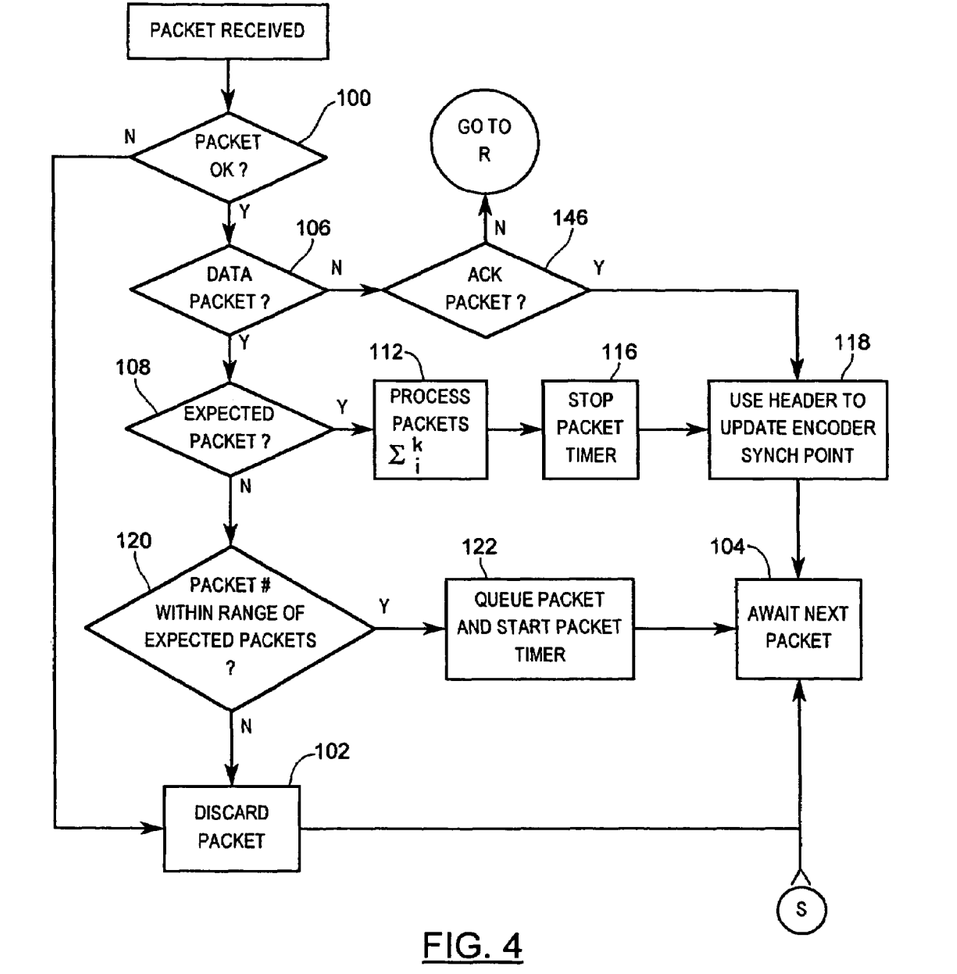
FIGS. 4 to 6 are flow charts illustrating the operation of the synchronization mechanisms of FIGS. 2a and 2b.
Figure 5:
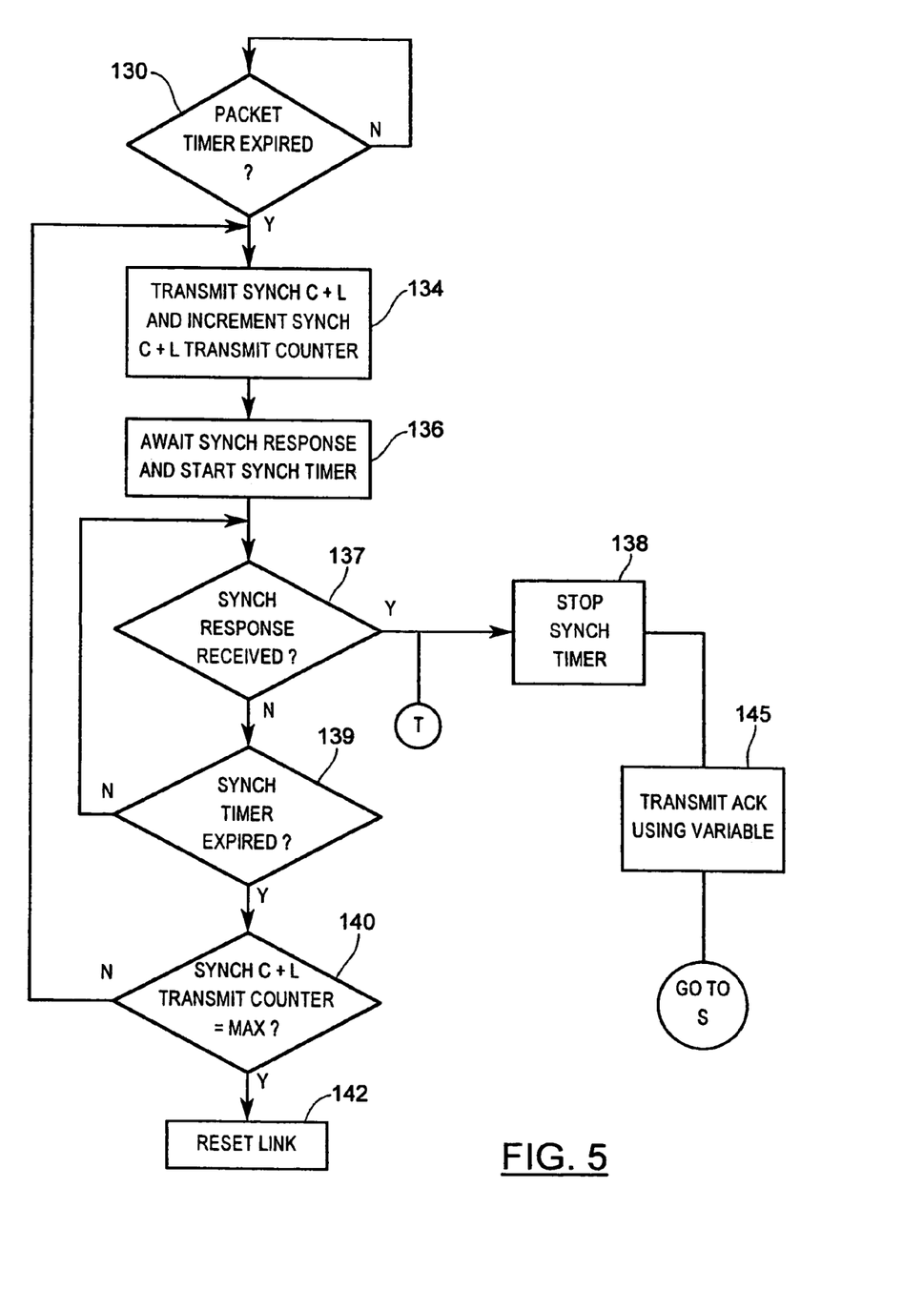
Figure 6:
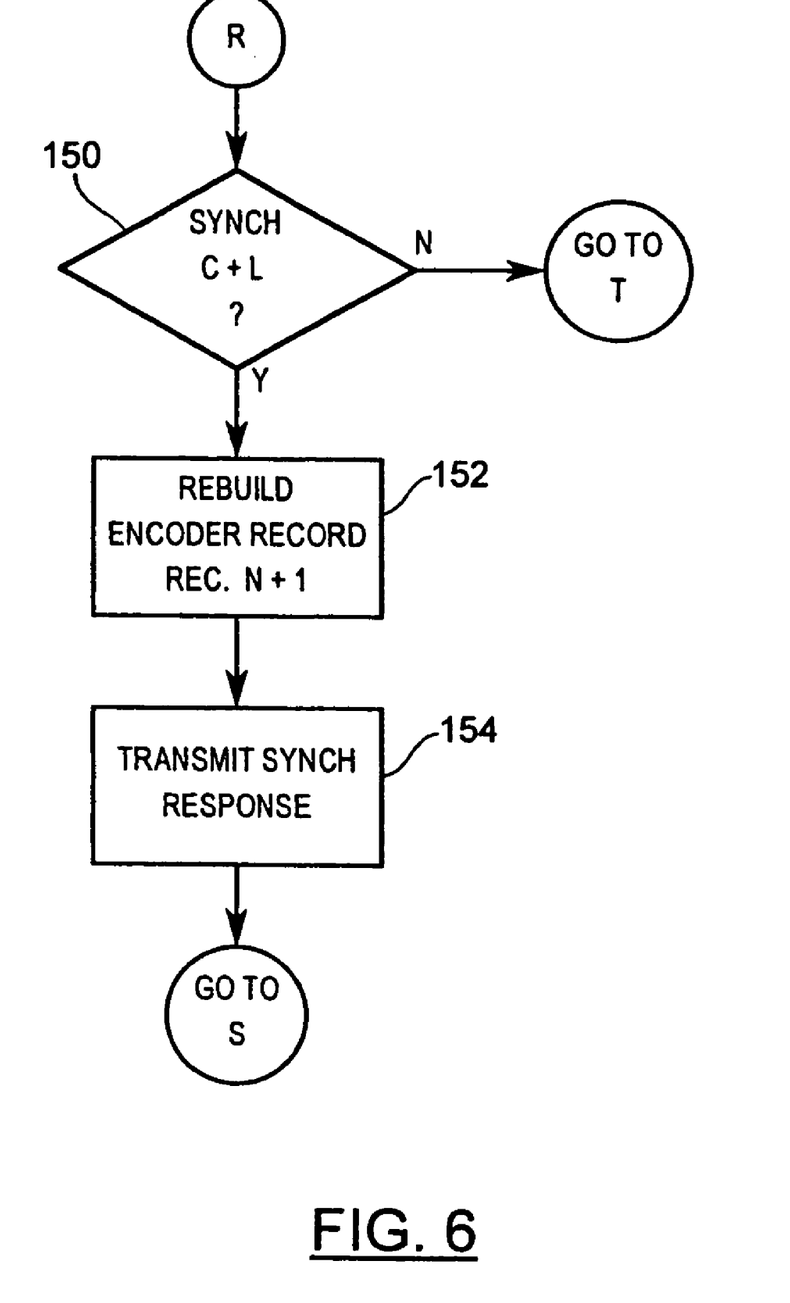

The operation of the synchronization mechanisms 18 will now be described with particular reference to FIGS. 4 to 6. In this particular example, it will be assumed that only digital system 12 is transmitting data packets. Accordingly, in response to each received and processed packet, the receiving digital system 14 returns an acknowledgment packet.

When the sending digital system 12 initiates data transmission, the encoder 20 encodes the data to be transmitted using history/state information stored in the memory 22 that has been acknowledged by the receiving digital system 14 and loads the encoded data into frames. Accordingly, in the example of FIG. 3*a*, the encoder 20 can use records Rec. N−1 or Rec. N to encode the data since these records have been acknowledged by the decoder 24. The encoder 20 however, cannot use record Rec. N+1 to encode the data since this record has not been acknowledged by the decoder 24. As each frame is loaded, the synchronization mechanism 18 encapsulates the frame with a header as described previously and transmits the data packet to the receiving digital system 14 over the lossy transmission media 16.

When the packet is received by the receiving digital system 14, a cyclic redundancy check (CRC) is performed on the packet to determine if the data in the packet is uncorrupted (block 100). If the packet data is corrupted, the packet is discarded (block 102) and the receiving digital system 14 awaits the next data packet (block 104). If the packet data is uncorrupted, the synchronization mechanism 18 of the receiving digital system 14 examines the packet header to determine the packet type (block 106). If the packet is a data packet, the synchronization mechanism 18 examines the Pkt_Tag tag of the header to determine if the received packet is the expected packet (block 108).

If the data packet is the expected packet, the packet is placed in a queue. Sequential packets in the queue are processed by the digital system 14 (block 112). In order to process each packet, the decoder 24 uses the Encode_Hist_Tag_Used tag of the packet header to determine the history/state information used by the encoder 20 to encode the packet data. The decoder then extracts the corresponding history/state information from the memory 26 and decodes the packet.

Once the decoder 24 has processed the packet, the decoder updates the history/state information using the packet. The decoder then generates an acknowledgment packet (block 118). The acknowledgment packet is returned to the sending digital system 12 to acknowledge receipt of the packet and inform the sending digital system 12 that it should update the encoder history/state information used to encode packets. Following this, the receiving digital system 14 awaits receipt of the next packet (block 104).

If the packet number of the data packet is not the packet number of the expected packet but is within a defined range of the expected packet number, signifying the packet has been received out of sequence (block 120), the packet is placed in the queue and a packet timer for the missing packet is initiated (block 122). The receiving digital system 14 then waits for the next packet (block 104). If the missing packet is received before the packet timer expires, all sequential packets in the queue are processed at block 112 and the packet timer is stopped (block 116).

If the packet number of the data packet is outside of the predefined range of the expected packet number, the packet is discarded (block 102) and the receiving digital system 14 awaits receipt of the next packet (block 104).

If the packet timer expires before it has been stopped at block 116 (block 130), the synchronization mechanism of the receiving digital system 14 transmits a synch control packet to the sending digital system 12 signifying an unsynchronized state and informing the sending digital system 12 of its current decoder history/state information. The synchronization mechanism 18 also increments a synch control transmit counter (block 134). The synchronization mechanism 18 then starts a synch timer and awaits receipt of a synch response packet from the sending digital system 12 (block 136).

After the synch control packet has been sent, the synchronization mechanism also conditions the decoder 24 to process packets in the queue until the next missing packet is detected. A variable is set to remember to where in the queue packets have been processed.

If a synch response packet is received (block 137) from the sending digital system 12 before the synch timer expires, the synch timer is stopped (block 138). The synchronization mechanism 18 then generates the acknowledgment packet in response to the variable set at block 132 (block 145) and the receiving digital system 14 awaits the next packet (block 104). If the synch timer expires (block 139), the count of the synch control transmit counter is examined to determine if the count value exceeds a threshold (block 140). If not, the synchronization mechanism returns to block 134. Thus, the synchronization mechanism 18 transmits another synch control packet to the sending digital system 12 and increments the synch control transmit counter.

At block 140, if the count of the synch control transmit counter is determined to equal the threshold, the link between the sending and receiving digital systems is reset (block 142).

When the sending digital system 12 receives a packet from the receiving digital system 14, the synchronization mechanism 18 checks the packet to determine if the packet is corrupted (block 100). If so, the packet is discarded (block 102). If the packet is uncorrupted, the synchronization mechanism 18 checks the packet to determine if it is a data packet (block 106). In this example, the sending digital system 12 receives from the receiving digital system 14 either acknowledgment packets signifying proper receipt of transmitted packets or synch control packets signifying an unsynchronized state between the sending and receiving digital systems 12 and 14.

If the incoming packet is an acknowledgment packet (block 146), the sending digital system 12 uses the Acking_Peer_Encoder_Hist_Tag tag of the packet header to update the history/state information of the encoder 20 so that record Rec. N+1 becomes record Rec. N. (block 118). This new encoder history/state information record Rec.N can then used by the encoder 20 to encode data since the history/state information has been acknowledged by the receiving digital system 14.

If the incoming packet is a synch control packet (block 150), the synchronization mechanism 18 of the sending digital system 12 uses the Last_Acked_Peer_Xmit_Hist_Tag tag to condition the encoder to rebuild record Rec. N+1 without using the missing packet (block 152). The synchronization mechanism 18 also sends a synch response packet to the receiving digital system 14 having a number equal to the number assigned to the received synch control packet (block 154).

As mentioned previously, when the receiving digital system 14 receives the synch response packet, the synchronization mechanism 18 matches the synch response packet with the transmitted synch control packet and stops the synch timer (block 138). The synchronization mechanism 18 then generates an acknowledgment packet acknowledging the packets in the queue that were processed up to the set variable (block 145). At this point, the sending and receiving digital systems 12 and 14 are considered to be resynchronized and the process continues.

As will be appreciated in this embodiment, when the history/state information in the memories is being updated, multiple records of the history/state information are maintained. Alternatively, deltas reflecting changes to the history/state information records can be stored to reduce memory usage.

For example if packet M+1 is lost and its information is used in encoder history/state information record Rec. N+1, a synch control packet is sent by the synchronization mechanism 18 to the sending digital system 12 acknowledging the last processed packet M. When the synchronization mechanism 18 of the digital system 12 receives the synch control packet, it conditions the encoder 20 to discard record Rec. N+1 and the packet M+1 information, and to rebuild record Rec. N+1 by summing the information of record Rec. N with the information of packets M+2, . . . M+j. Once all of the packets M+2 to M+j are acknowledged by the synchronization mechanism, record Rec. N+1 becomes record Rec. N and the encoder can use this record to encode packets.

As will be appreciated, when the sending and receiving digital systems become unsynchronized, the encoder history/state information is conditioned to the last known point at which the digital systems were known to be synchronized and not to its initial state as is common in prior art systems. This allows synchronization between the sending and receiving digital systems to be less tightly coupled. In this manner, encoding efficiency can be maintained since prior encoder history/state information is not lost. As a result, compressibility need not be reduced significantly when packet loss is detected and retransmission of lost data is required. This is particularly attractive when transmitting packetized data over unreliable networks such as the Internet and Frame Relay and IP networks.

Also, although the encoder history/state information is described as being conditioned to the last known synchronization state of the sending and receiving digital systems, the encoder history/state information can be conditioned in some instances to other prior non-initial states. Of course, conditioning the encoder history/state information to the last known synchronization state increases encoding efficiency.

Although the receiving digital system is described as sending acknowledgment packets to the sending digital system in response to received packets, those of skill in the art will appreciate that bi-directional communication between the digital systems can occur. In this instance, packet acknowledgment headers are used to encapsulate data frames to be transmitted by the receiving digital system to acknowledge receipt of the packets.

Although a preferred embodiment of the present invention has been described, those of skill in the art will appreciate that variations and modifications may be made without departing from the spirit and scope thereof as defined by the appended claims.

I claim:

1. A method for transmitting encoded data between synchronized sending and receiving digital systems across a lossy transmission media, said sending and receiving digital systems maintaining respective encoder and decoder information records, said method comprising the steps of:

encoding packet data to be transmitted by said sending digital system using encoding information in an encoder information record that has been previously acknowledged by said receiving digital system;

building a new encoder information record including the encoding information used to encode said packet data as well as the packet data;

transmitting the encoded packet data to said receiving digital system as a packet including a header having a packet number and a tag identifying the encoding information used to encode the packet data;

when the packet is received by said receiving digital system, examining the header to determine the encoding information used to encode said packet data;

decoding the packet using corresponding decoder information in said decoder information record and updating the decoder information in said decoder information record with said packet data;

acknowledging processing of the packet to said sending digital system to enable said sending digital system to update said encoder information so that said new encoder information record is used to encode future packet data to be transmitted; and when the packet is lost, at the sending digital system rebuilding the new encoder information record without the lost packet data.

2. The method of claim 1 wherein said rebuilding step is performed when a packet is received out of sequence by said receiving digital system and a threshold amount of time elapses without the missing packet being received.

3. The method of claim 2 wherein packets received out of sequence are stored in a queue and wherein a packet timer is initiated by said receiving digital system to count said threshold amount of time when a packet is received out of sequence, said packet timer being stopped when said missing packet is received.

4. The method of claim 3 wherein said rebuilding step includes the step of sending a synch control packet from said receiving digital systems to said sending digital system, said synch control packet including a tag identifying the last packet processed by said receiving digital system, said sending digital system using said synch control packet to rebuild said new encoder information record.

5. The method of claim 4 wherein said rebuilding step further includes the steps of initiating a synchronization timer at said receiving digital system when said synch control packet is sent; stopping said timer when an acknowledgment is received from said sending digital system in response to said synch control packet; and resending the synch control packet and reinitiating the synchronization timer if said synchronization timer expires and an acknowledgment has not been received.

6. The method of claim 5 wherein said rebuilding step further includes the steps of incrementing a counter each time a synch control packet is sent; comparing the value of said counter to determine if the value equals a threshold prior to resending the synch control packet and reinitiating the synchronization timer; and resetting the communication link between said sending and receiving digital systems if the value of said counter equals said threshold value.

7. The method of claim 1 wherein during said acknowledging step, an acknowledgment packet is returned to said sending digital system, said acknowledgment packet including identifying the last packet processed by said receiving digital system.

8. The method of claim 1 wherein during said acknowledging step, an acknowledgment header encapsulating data packets is returned to said sending digital system, said acknowledgment header identifying the last packet processed by said receiving digital system.

9. The method of claim 1 further comprising the steps of, prior to decoding said packets by said receiving digital system, examining said packets to detect corrupted packets and discarding corrupted packets.

10. The method of claim 9 wherein during said examining step a cyclic redundancy check is performed on said packets.

11. The method of claim 10 further comprising the step of discarding received packets having packet numbers outside of a defined range of expected packet numbers.

12. The method of claim 6 further comprising the steps of, prior to decoding said packets by said receiving digital system, examining said packets to detect corrupted packets and discarding corrupted packets.

13. The method of claim 12 wherein during said examining step a cyclic redundancy check is performed on said packets.

14. The method of claim 13 further comprising the step of discarding received packets having packet numbers outside of a defined range of expected packet numbers.

15. The method of claim 1 wherein during encoding, the packet data is compressed, encrypted and/or scrambled.

16. The method of claim 9 wherein during encoding, the packet data is compressed, encrypted and/or scrambled.

17. A communication system including synchronized sending and receiving digital systems transmitting encoded data across a lossy transmission medium, said sending and receiving digital systems maintaining respective encoder and decoder information records, said communication system comprising:

at the sending digital system, an encoder recorded in a memory, for encoding packet data to be transmitted using encoding information in an encoder information record that has been previously acknowledged by said receiving digital system;

an encoder information record construct for building a new encoder information record including the encoding information used to encode said packet data as well as the packet data;

a transmitter for transmitting the encoded packet data to the receiving digital system as a packet including a header having a packet number and a tag identifying the encoding information used to encode the packet data;

at the receiving digital system, a header destruct for examining the header to determine the encoding information used to encode said packet data;

a decoder recorded in a memory of said receiving digital system, for decoding the packet using corresponding decoder information in said decoder information record and updating the decoder information in the decoder information record with the packet data; and an acknowledger for acknowledging processing of the packet to the sending digital system to enable the sending digital system to update the encoder information so that the new encoder information record is used to encode packet data, wherein when a packet is lost, said encoder information record construct is conditioned to rebuild the new encoder information record without the lost packet data.

18. A communication system according to claim 17 wherein said encoder information construct is conditioned to rebuild the new encoder information record when a packet is received by said receiving digital system out of sequence and a threshold amount of time elapses without the missing packet being received by the receiving digital system.

19. A communication system according to claim 18 wherein said receiving digital system stores packets received out of sequence in a queue and initiates a packet timer to count said threshold amount of time when a packet is received out of sequence, said packet timer being stopped when said missing packet is received.

20. A communication system according to claim 19 wherein said receiving digital system sends a synch control packet to said sending digital system when a packet is lost, said encoder information record construct being responsive to said synch control packet to rebuild the new encoder information record, said synch control packet including a tag identifying the last packet processed by said receiving digital system.

* * * * *